(12) United States Patent
Langlais et al.

(10) Patent No.: US 8,493,820 B1
(45) Date of Patent: Jul. 23, 2013

(54) MATCHED CTE DRIVE

(76) Inventors: Timothy Edward Langlais, Minneapolis, MN (US); Troy Michael Herndon, San Jose, AZ (US)

( * ) Notice: Subject to any disclaimer, the term of this patent is extended or adjusted under 35 U.S.C. 154(b) by 0 days.

(21) Appl. No.: 13/481,731

(22) Filed: May 25, 2012

(51) Int. Cl.
*G11B 11/00* (2006.01)

(52) U.S. Cl.
USPC .................. 369/13.33; 369/13.24; 360/69

(58) Field of Classification Search
None
See application file for complete search history.

(56) References Cited

U.S. PATENT DOCUMENTS

| | | | |
|---|---|---|---|
| 6,619,847 B1 | 9/2003 | Ishikawa et al. | |
| 6,619,848 B2 | 9/2003 | Ishikawa et al. | |
| 6,712,517 B2 | 3/2004 | Hokkirigawa et al. | |
| 6,731,456 B2 | 5/2004 | Parsoneault et al. | |
| 6,799,893 B2 | 10/2004 | Hokkirigawa et al. | |
| 7,168,857 B2 | 1/2007 | Hokkirigawa et al. | |
| 7,196,028 B2 | 3/2007 | Ujita et al. | |
| 7,465,097 B2 | 12/2008 | Kull | |
| 7,625,125 B2 | 12/2009 | Kull et al. | |
| 8,002,471 B2 | 8/2011 | Satoji et al. | |
| 8,374,063 B2 * | 2/2013 | Tanaka et al. | 369/13.33 |
| 2003/0107281 A1 | 6/2003 | Obara | |

FOREIGN PATENT DOCUMENTS

| | | |
|---|---|---|
| DE | 102007046248 | 4/2009 |
| EP | 515687 A1 | 5/1992 |
| EP | 488402 | 6/1992 |
| EP | 825159 | 2/1998 |

* cited by examiner

*Primary Examiner* — Muhammad N Edun (57) ABSTRACT

A thermally compensated fluid dynamic bearing motor includes a stationary member and a rotatable member rotatable about the stationary member. A hub is coupled with the rotatable member and includes ceramic material with a first coefficient of thermal expansion, wherein the hub is operable to be coupled with a data storage disk. Further the first coefficient of thermal expansion is substantially equal to a second coefficient of thermal expansion of the data storage disk.

17 Claims, 6 Drawing Sheets

MATCHED CTE DRIVE

FIELD

Embodiments according to the present invention generally relate to fluid dynamic bearing motors.

BACKGROUND OF THE INVENTION

In magnetic recording media, for example as used in disk drive storage devices, information is written to and read from magnetic elements that represent digital bits on a hard disk. The magnetic elements may be arranged in circular and concentric data tracks on the surface of one or more disks. The disks may be coupled with a hub that rotates about a shaft of a motor.

In order to increase the amount of information that can be stored within a given area, the size and distance between the magnetic elements on the surface of the disks may be reduced so that they may be more densely positioned. For example, one way to achieve such a goal is to use heat-assisted magnetic recording (HAMR) technology. In HAMR, focused heating and magnetic recording may be used to magnetically record data on a high-coercivity material on a disk substrate that allows for high areal density of magnetic elements.

For high-coercivity materials, the strength of magnetic fields used for writing data may not be strong enough to change the magnetic orientation of such materials at regular temperatures. Using, for example, laser thermal assistance, a high-coercivity material may be locally and temporarily heated such that the material loses its high coercivity, allowing the magnetic field to write data to the material.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Figure 4:
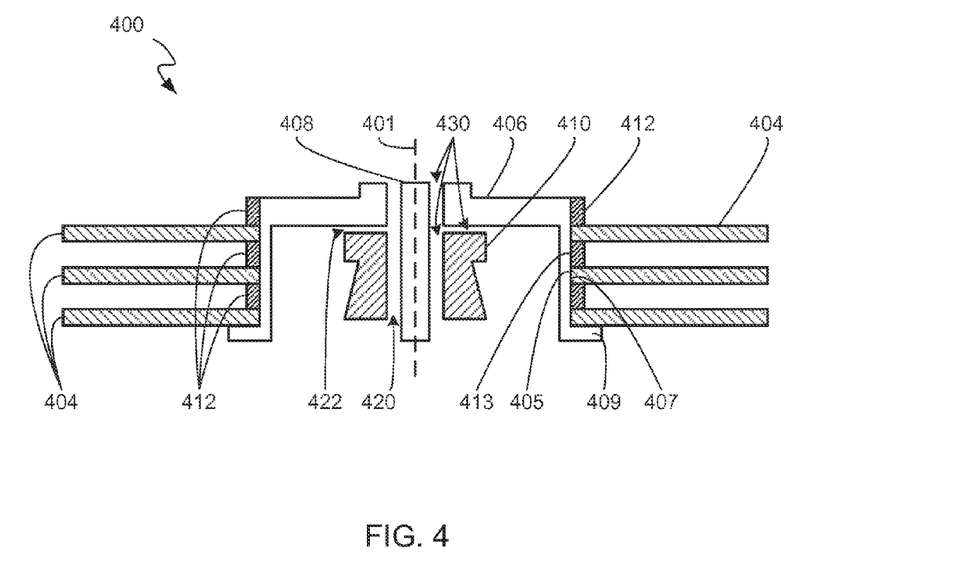
FIG. 4 is a cross-sectional view of a fluid dynamic bearing motor, according to an embodiment of the present invention.

For expository purposes, the terms "axially" or "axial direction" refers to a direction along a centerline axis length of a shaft, e.g., along centerline axis 401 of shaft 408 in FIG. 4, and "radially" or "radial direction" refers to a direction perpendicular to the centerline axis 401. The term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Embodiments of the present invention provide methods and systems for reducing wear and increasing the lifetime of fluid dynamic bearings, e.g. fluid dynamic bearings used in hard disk storage devices. However, embodiments of the present invention can be applied to any device utilizing fluid dynamic bearings. Furthermore, embodiments of the present invention provide methods and systems for reducing or eliminating disk slip. For example, the coefficient of thermal expansion of components of a hard disk storage device may be substantially matched with the coefficient of thermal expansion of disks or disk substrates, for example disks or disk substrates used in heat-assisted magnetic recording (HAMR) technology.

Hard disk storage devices may be exposed to varying temperatures. For example, a disk drive may be exposed to colder temperatures while stored in an airplane's cargo hold and then exposed to warmer temperatures when used outdoors on a hot summer day. Conversely, a disk drive may be exposed to warmer temperatures followed by exposure to colder temperatures. Such variations in temperature exposure, for example from hot to cold and vice versa, may be called thermal cycling.

The coefficient of thermal expansion (CTE) of a material describes the material's tendency to change in volume in response to a change in temperature. When a material is heated or cooled, it typically expands or contracts, respectively. Different materials may expand or contract at different rates in response to temperature changes. The degree of expansion divided by the change in temperature is the material's CTE.

When components of a hard disk storage device have different CTEs, the different components may expand and contract at different rates during thermal cycling. The different rates of expansion and contraction may cause the structure of the hard disk storage device to become disrupted, which in turn may cause at least disk slip and/or distortion. Disk slip or distortion may cause performance issues because the absolute location of the data tracks may change and the factory calibration or presets may no longer be accurate.

For example, disk slip may occur when one component may be pushing against a disk. If a radial force is high enough and the friction is low enough, the disc may slip radially. However, if the force is axial or if the radial force is insufficient to overcome friction, the disk will distort axially, radially, or both. This causes flyability issues for the head that leads to reliability problems or the same tracking issues caused by disk slip.

Certain technologies, e.g. HAMR technology, utilize materials with high CTEs to form hard disks. Embodiments of the present invention allow for multiple components of a hard disk storage device to have substantially similar CTEs so that disk slip may be reduced or eliminated. For example, multiple components of a hard disk storage device may have substantially the same CTE as the materials used to form hard disks with HAMR technology.

Furthermore, some embodiments of the present invention provide a decrease in the wear of fluid dynamic bearings, resulting in increased lifetime of such bearings. For example, ceramic materials may be used for the hub, sleeve, substrate spacers, and/or shaft of a fluid dynamic bearing to decrease bearing wear.

In addition, various embodiments allow for thermal compensation of a fluid dynamic bearing. For example, a fluid dynamic bearing may be formed in part by a hub or sleeve with a low CTE. As temperature changes inside a fluid dynamic bearing due to changes in operation or environmental factors, the viscosity of the bearing oil may change, affecting the stiffness of the bearing.

To counteract the effects of temperatures changes, a shaft may be formed by a material with a higher CTE than a hub or sleeve. Since the shaft may expand or contract more rapidly than the hub or sleeve, the volume of the gap of a journal or thrust bearing where oil resides may be decreased or increased, respectively. As a result, when the stiffness increases due to increased oil viscosity, the increased journal or thrust bearing volume may act to maintain the stiffness. Conversely, when the stiffness decreases due to decreased oil viscosity, the decreased journal or thrust bearing volume may act to maintain the stiffness.

Figure 1:
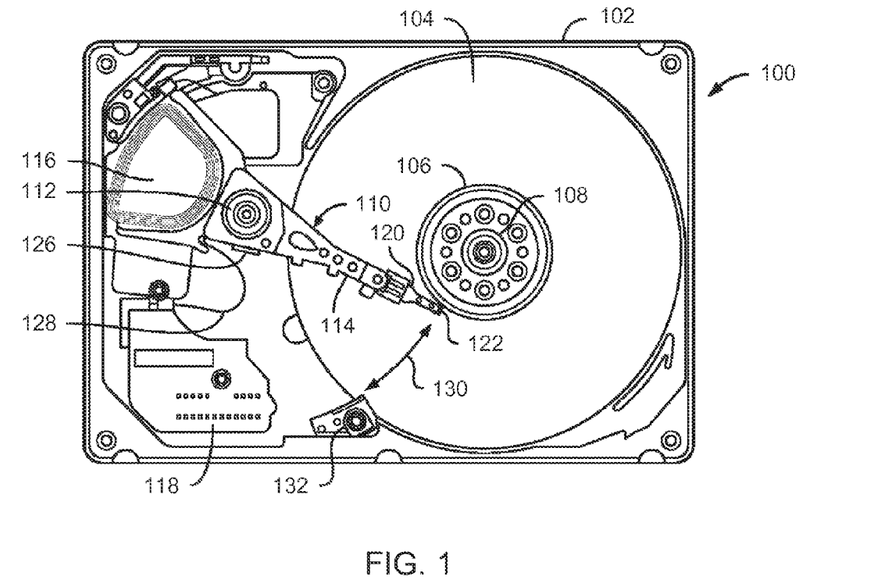
FIG. 1 is a plan view of a data storage device in which embodiments of the present invention can be implemented.

FIG. 1 is a plan view of a data storage device in which embodiments of the present invention can be implemented. A disk drive 100 generally includes a base plate 102 and a cover (not shown) that may be disposed on the base plate 102 to define an enclosed housing for various disk drive components. The disk drive 100 includes one or more disk substrates or data storage disks 104 of computer-readable data storage media. Typically, both of the major surfaces of each data storage disk 104 include a plurality of concentrically disposed tracks for data storage purposes. Each data storage disk 104 is mounted on a hub or spindle 106, which in turn is rotatably interconnected with the base plate 102 and/or cover. Multiple data storage disks 104 are typically mounted in vertically spaced and parallel relation on the spindle 106. A spindle motor 108 rotates the data storage disks 104.

The disk drive 100 also includes an actuator arm assembly 110 that pivots about a pivot bearing 112, which in turn is rotatably supported by the base plate 102 and/or cover. The actuator arm assembly 110 includes one or more individual rigid actuator arms 114 that extend out from near the pivot bearing 112. Multiple actuator arms 114 are typically disposed in vertically spaced relation, with one actuator arm 114 being provided for each major data storage surface of each data storage disk 104 of the disk drive 100. Other types of actuator arm assembly configurations could be utilized as well, e.g. an "E" block having one or more rigid actuator arm tips or the like that cantilever from a common structure. Movement of the actuator arm assembly 110 is provided by an actuator arm drive assembly, such as a voice coil motor 116 or the like. The voice coil motor 116 is a magnetic assembly that controls the operation of the actuator arm assembly 110 under the direction of control electronics 118.

A load beam or suspension 120 is attached to the free end of each actuator arm 114 and cantilevers therefrom. Typically, the suspension 120 is biased generally toward its corresponding data storage disk 104 by a spring-like force. A slider 122 is disposed at or near the free end of each suspension 120. What is commonly referred to as the read/write head (e.g., transducer) is appropriately mounted as a head unit (not shown) under the slider 122 and is used in disk drive read/write operations. The head unit under the slider 122 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 122 is connected to a preamplifier 126, which is interconnected with the control electronics 118 of the disk drive 100 by a flex cable 128 that is typically mounted on the actuator arm assembly 110. Signals are exchanged between the head unit and its corresponding data storage disk 104 for disk drive read/write operations. In this regard, the voice coil motor 116 is utilized to pivot the actuator arm assembly 110 to simultaneously move the slider 122 along a path 130 and across the corresponding data storage disk 104 to position the head unit at the appropriate position on the data storage disk 104 for disk drive read/write operations.

When the disk drive 100 is not in operation, the actuator arm assembly 110 is pivoted to a "parked position" to dispose each slider 122 generally at or beyond a perimeter of its corresponding data storage disk 104, but in any case in vertically spaced relation to its corresponding data storage disk 104. In this regard, the disk drive 100 includes a ramp assembly 132 that is disposed beyond a perimeter of the data storage disk 104 to both move the corresponding slider 122 vertically away from its corresponding data storage disk 104 and to also exert somewhat of a retaining force on the actuator arm assembly 110.

Figure 2:
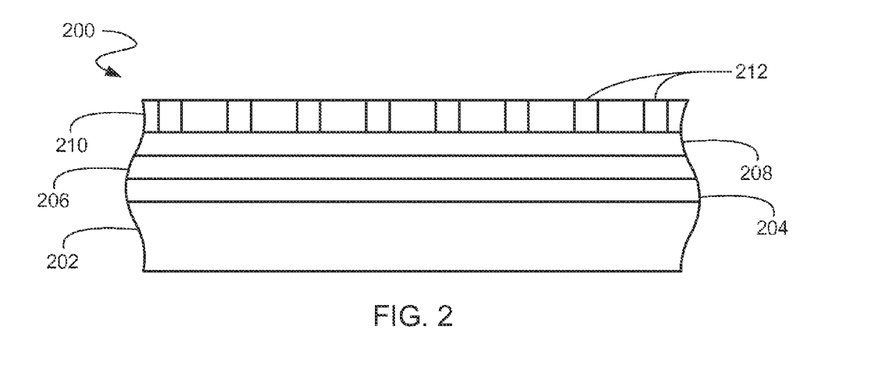
FIG. 2 is a simplified cross-sectional view of a perpendicular magnetic recording medium, which may be used for the data storage disk in an embodiment of the present invention.

FIG. 2 is a simplified cross-sectional view of a perpendicular magnetic recording medium 200, which may be used for the disk substrate or data storage disk 104 (FIG. 1). The perpendicular magnetic recording medium 200 is an apparatus that may include multiple layers established upon a disk substrate 202. A seed layer 208 may be a layer that is established overlying the substrate. A base layer 210 may be a layer that is established overlying the seed layer 208. Perpendicular magnetic recording islands 212 are recording areas that are established in the base layer 210 and on the seed layer 208.

The substrate 202 can be fabricated from materials known to those skilled in the art to be useful for magnetic recording media for hard disk storage devices, including materials that may be used in conjunction with HAMR technology and/or materials with high-coercivities. For example, the substrate 202 may be fabricated from aluminum (Al) coated with a layer of nickel phosphorous (NiP), glass and glass-containing materials including glass-ceramics, and ceramics including crystalline, partly crystalline, and amorphous ceramics. High-coercivity materials may have a coercivity of 20-50 kilo-oersteds (kOe). The substrate 202 may have a smooth surface upon which the remaining layers can be deposited. The remaining layers may include materials that may be used in conjunction with HAMR technology. For example, high-coercivity magnetic compounds such as iron-platinum (FePt) or cobalt-platinum (CoPt) alloys.

In a further embodiment, a buffer layer 204 may be established overlying the substrate 202, a soft underlayer 206 may be established overlying the buffer layer 204, and the seed layer 208 may be overlying the soft underlayer 206. The buffer layer 204 can be established from elements such as Tantalum (Ta). The soft underlayer 206 can be established from soft magnetic materials such as CoZrNb, CoZrTa, FeCoB and FeTaC. The soft underlayer 206 can be formed with a high permeability and a low coercivity. For example, in an embodiment the soft underlayer 206 may have a coercivity of not greater than about 10 oersteds (Oe) and a magnetic permeability of at least about 50. The soft underlayer 206 may comprise a single soft underlayer or multiple soft underlayers, and may be separated by spacers. If multiple soft underlayers are present, the soft underlayers can be fabricated from the same soft magnetic material or from different soft magnetic materials.

In the embodiment illustrated, the seed layer 208 is disposed on the soft underlayer 206. The seed layer 208 can be established, for example, by physical vapor deposition (PVD) or chemical vapor deposition (CVD) from noble metal materials such as, for example, Ru, Ir, Pd, Pt, Os, Rh, Au, Ag or other alloys. The use of these materials results in desired growth properties of the perpendicular magnetic recording islands 212.

The perpendicular magnetic recording islands 212 as described herein may be formed within the base layer 210 and on the seed layer 208 according to the embodiments of the present invention. The perpendicular magnetic recording islands 212 can be established to have an easy magnetization axis (e.g., the C-axis) that is oriented perpendicular to the surface of the perpendicular magnetic recording medium 200. Useful materials for the perpendicular magnetic recording islands 212 may include, for example, cobalt-based alloys with a hexagonal close packed (hcp) structure. Cobalt can be alloyed with elements such as chromium (Cr), platinum (Pt), boron (B), niobium (Nb), tungsten (W) and tantalum (Ta).

The perpendicular magnetic recording medium 200 can also include a protective layer (not shown) on top of the perpendicular magnetic recording islands 212 and/or the base layer 210, such as a protective carbon layer, and a lubricant layer disposed over the protective layer. These layers are adapted to reduce damage from the read/write head interactions with the recording medium during start/stop operations. It should be appreciated that embodiments of the present invention can be applied with the use of other recording mediums as well, e.g., a longitudinal recording medium, bit-patterned media (BPM), discrete track recording (DTR), other non-perpendicular magnetic recording mediums, and so on. It should also be appreciated that embodiments of the present invention can be applied with the use of non-HAMR technology devices, for example other disks or disk substrates with high CTEs.

Figure 3:
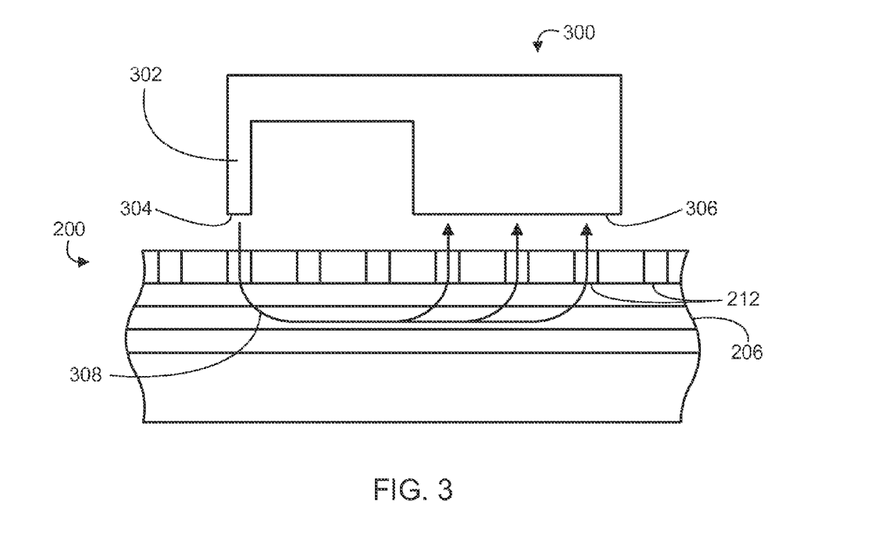
FIG. 3 is a simplified cross-sectional view of a portion of the perpendicular magnetic recording medium with a head unit, which may be used in embodiments of the present invention.

FIG. 3 is a simplified cross-sectional view of a portion of the perpendicular magnetic recording medium 200 with a head unit 300. During the writing process, a perpendicular write head 302 flies or floats above the perpendicular magnetic recording medium 200. The perpendicular write head 302 includes a write pole 304 coupled to an auxiliary pole 306. The arrows shown indicate the path of a magnetic flux 308, which emanates from the write pole 304 of the perpendicular write head 302, entering and passing through at least one perpendicular magnetic recording island 212 in the region below the write pole 304, and entering and traveling within the soft underlayer 206 for a distance. The magnetically soft underlayer 206 serves to guide magnetic flux emanating from the head unit 300 through the recording island 212, and enhances writability. As the magnetic flux 308 travels towards and returns to the auxiliary pole 306, the magnetic flux 308 disperses.

The magnetic flux 308 is concentrated at the write pole 304, and causes the perpendicular magnetic recording island 212 under the write pole 304 to magnetically align according to the input from the write pole 304. As the magnetic flux 308 returns to the auxiliary pole 306 and disperses, the magnetic flux 308 may again encounter one or more perpendicular magnetic recording islands 212. However, the magnetic flux 308 is no longer concentrated and passes through the perpendicular magnetic recording islands 212, without detrimentally affecting the magnetic alignment of the perpendicular magnetic recording islands 212.

However, magnetic recording medium used in conjunction with HAMR technology may additionally use localized heating in order for the magnetic alignment of the perpendicular magnetic recording islands 212 to be affected. In HAMR, data is magnetically recorded on a high-coercivity material that allows for high areal density of magnetic elements. For high-coercivity materials, the strength of magnetic fields used for writing data is typically not strong enough to change the magnetic orientation of such materials at regular temperatures.

Using laser thermal assistance, a high-coercivity material may be locally and temporarily heated such that the material loses its high coercivity, allowing the magnetic field to write data to the material. However, such high-coercivity materials used with HAMR technology typically have CTEs that are significantly different from the CTEs of traditional materials of hubs and other components of a hard disk drive.

FIG. 4 is a cross-sectional view of a fluid dynamic bearing motor 400, according to an embodiment of the present invention. The fluid dynamic bearing motor 400 may be used in the disk drive 100 (FIG. 1). For example, disk substrates or data storage disks 404 may correspond to the disk substrates or data storage disks 104 (FIG. 1) or disk substrate 202 (FIG. 2).

The fluid dynamic bearing motor 400 may reduce wear by reducing friction while maintaining the alignment between a hub 406, a shaft 408, and/or a sleeve 410. The data storage disks 404 may be supported and rotated by the fluid dynamic bearing motor 400 about a centerline axis 401.

The data storage disks 404 may be rotated at high speeds during operation using magnets (not shown) and a stator (not shown). Magnets, for example mounted on the hub 406 may interact with the stator to cause rotation of the hub 406 relative to the stator. The magnets may be formed as a unitary annular ring or may be formed as a plurality of individual magnets that are spaced about the periphery of the hub. The magnets may be magnetized to form two or more magnetic poles.

Figure 5:
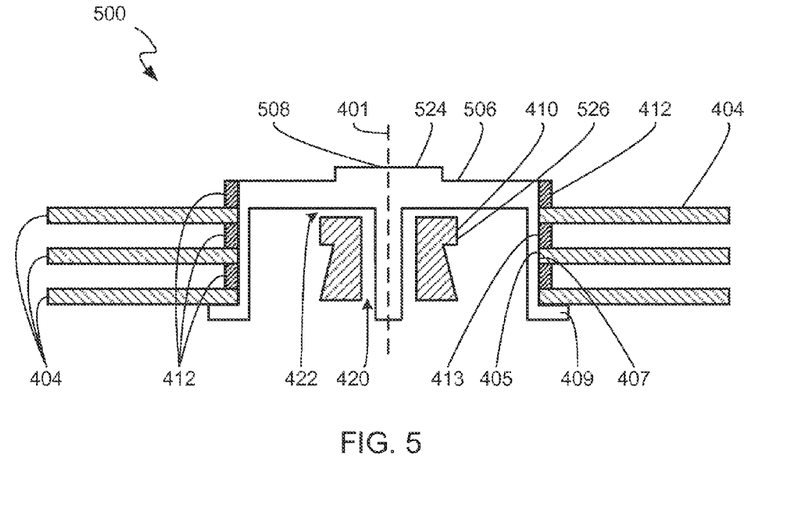
FIG. 5 is a cross-sectional view of a fluid dynamic bearing motor with a coupled hub portion and shaft portion, according to an embodiment of the present invention.
Figure 6:
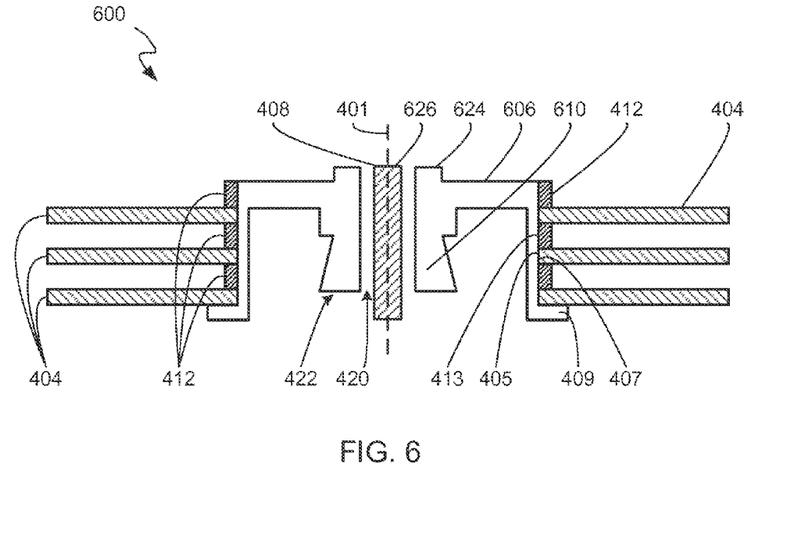
FIG. 6 is a cross-sectional view of a fluid dynamic bearing motor with a coupled hub portion and sleeve portion, according to an embodiment of the present invention.

The fluid dynamic bearing motor 400 includes a stationary component and a rotatable component. The rotatable component rotates relative to the stationary component and defines a fluid dynamic journal bearing 420 and a thrust bearing 422 therebetween. FIG. 5 and FIG. 6 illustrate various examples of stationary components and rotatable components, according to embodiments of the present invention.

FIG. 5 is a cross-sectional view of a fluid dynamic bearing motor 500 with a rotatable component 524 and a stationary component 526, according to an embodiment of the present invention. In one embodiment, the rotatable component 524 may include a hub portion 506 and a shaft portion 508 while the stationary component 526 includes the sleeve 410. For example, the hub portion 506 and shaft portion 508 may be coupled with one another to form a single unitary piece, such that they rotate together about the centerline axis 401.

Alternatively, the hub portion 506 and the shaft portion 508 may be originally formed from a single piece of material. The interface between the shaft portion 508 and the sleeve 410 may define the fluid dynamic journal bearing 420 while the interface between the hub portion 506 and the sleeve 410 may define the thrust bearing 422. According to some embodiments, the shaft portion 508 supports the hub portion 506 for constant rotation.

FIG. 6 is a cross-sectional view of a fluid dynamic bearing motor 600 with a rotatable component 624 and a stationary component 626, according to an embodiment of the present invention. In one embodiment, the rotatable component 624 may include a hub portion 606 and a sleeve portion 610 while the stationary component 626 includes the shaft 408. For example, the hub portion 606 and sleeve portion 610 may be coupled with one another to form a single unitary piece, such that they rotate together about the centerline axis 401.

Alternatively, the hub portion 606 and the sleeve portion 610 may originally be formed from a single piece of material. The interface between the hub portion 606 and the shaft 408 and/or the interface between the sleeve portion 610 and shaft 408 may define a fluid dynamic journal bearing 420. In addition, the thrust bearing 422 may be disposed underneath the sleeve portion 610 or above (not shown) the hub portion 606.

Returning to FIG. 4, in some embodiments, a fluid, e.g., a lubricating oil or a ferromagnetic fluid, fills the journal bearing 420, the thrust bearing 422, and/or interfacial regions 430 between the hub 406, the shaft 408, and/or the sleeve 410 as well as between other stationary and rotatable components (not shown). It is appreciated that the lubricating fluid described herein is exemplary and not intended to limit the scope of the embodiments of the present invention. For example, the fluid may include a lubricating liquid, a lubricating gas, or a combination of a lubricating liquid and lubricating gas.

In one embodiment, the shaft 408 and/or the sleeve 410 may include pressure generating grooves (not shown). It is appreciated that the pressure generating grooves may include asymmetric grooves and/or symmetric grooves. The asymmetric grooves and the symmetric grooves may have a pattern including, for example, a herringbone pattern or a sinusoidal pattern. The pressure generating grooves may be operable to, for example, induce fluid flow in the interfacial regions 430 in order to generate a localized region of dynamic high pressure and radial stiffness during rotation of the shaft 408.

The hub 406 may be coupled with the data storage disks 404. For example, an outer edge 407 of the hub 406 may directly contact an inner edge 405 of the data storage disks 404. Spacers 412 may be disposed between and support each of the data storage disks 404 and may separate the data storage disks 404 from one another. The hub 406 may also be coupled with the spacers 412. For example, the outer edge 407 of the hub 406 may directly contact an inner edge 413 of the spacers 412. The spacers 412 and data storage disks 404 may radially surround the shaft 408.

In addition, the hub 406 may support the data storage disks 404 and the spacers 412 for rotation about the centerline axis 401. For example, the hub 406 may vertically support the data storage disks 404 and the spacers 412 with a ledge 409. As a result, when the hub 406 is caused to rotate, the hub 406 may in turn rotate the data storage disks 404 and the spacers 412.

The data storage disks 404 may be formed by a high-coercivity material, a material with a low CTE, or other materials that may be used in HAMR technology. For example, the data storage disks 404 may be formed by an iron-platinum (FePt) alloy or a cobalt-platinum (CoPt) alloy. Such materials may allow the use of HAMR technology to achieve higher areal density of magnetic data storage elements.

In various embodiments, the hub 406 may be formed by a material with a CTE that is similar to the CTE of the data storage disks 404. For example, the hub 406 may be formed by a ceramic material or ceramic oxide, e.g., silicon carbide (SiC). Thus, the CTE of the hub 406 may be substantially matched with the CTE of the data storage disks 404. As a result, the hub 406 and the data storage disks 404 may proportionally expand and contract during thermal cycling. Accordingly, disk slip may be reduced or substantially prevented.

In some embodiments, both the hub 406 and the sleeve 410 may be formed by a material with a CTE that is similar to the CTE of the data storage disks 404. For example, the hub 406 and the sleeve 410 may be formed by a ceramic material or ceramic oxide, e.g., silicon carbide (SiC). Thus, the CTE of the sleeve 410 may be substantially matched with the CTE of the hub 406. As a result, the sleeve 410 and the hub 406 may proportionally expand and contract during thermal cycling. Accordingly, disk slip may be reduced or substantially prevented.

In various embodiments, the spacers 412 may be formed by a material with a CTE that is similar to the CTE of the data storage disks 404. As a result, the data storage disks 404 and spacers 412 may proportionally expand and contract, and disk slip may be reduced or substantially prevented. In further embodiments, the shaft 408 may be formed by a material with a CTE that is similar to the CTE of the data storage disks 404. As a result, the shaft 408 and the data storage disks 404 may proportionally expand and contract, and disk slip may be reduced or substantially prevented.

Figure 7A:
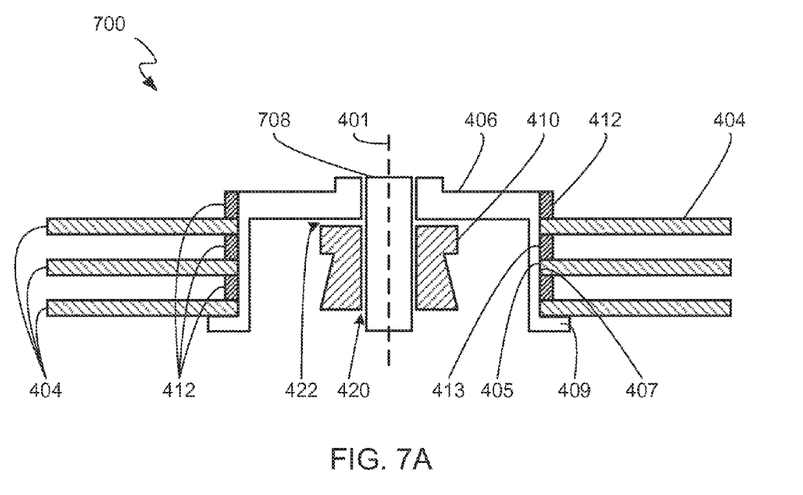
FIG. 7A is a cross-sectional view of a thermally compensated fluid dynamic bearing motor that has been heated, according to an embodiment of the present invention.

FIG. 7A is a cross-sectional view of a thermally compensated fluid dynamic bearing motor 700 reacting to an increase in temperature, according to an embodiment of the present invention. The thermally compensated fluid dynamic bearing motor 700 of FIG. 7A may be similar to the fluid dynamic bearing motor 400 of FIG. 4. However, in FIG. 7A, a shaft 708 may be formed by a material with a higher CTE than the hub 406 and/or the sleeve 410.

As the temperature of the fluid dynamic bearing changes, embodiments of the present invention allow for thermal compensation by counteracting the effects of a temperature change. For example, as temperature increases inside the fluid dynamic bearing motor 700 because of continued operation or environmental factors, the fluid or oil may decrease in viscosity. The decrease in fluid or oil viscosity may result in a decrease in stiffness of the fluid dynamic bearing motor 700.

To counteract the effects of a change in temperature, the shaft 708 may be formed by a material with a higher CTE than the hub 406 and/or the sleeve 410. For example, the shaft 708 may be formed by aluminum or steel, which have a higher CTE than some high-coercivity materials or other materials that may be used in HAMR technology. At the same time, the hub 406 and/or the sleeve 410 may be formed by a high-coercivity material with a low CTE, e.g., a ceramic material.

Thus, the shaft 708 with a higher CTE may expand at a faster rate than the hub 406 or the sleeve 410 in response to a temperature increase. Accordingly, the distance between the shaft 708 and either the hub 406 (i.e., the gap of the journal bearing 420) or sleeve 410 (i.e. the gap of the thrust bearing 422), may decrease in response to the temperature increase. As a result, even though the fluid or oil may have become less viscous as the temperature increases, the decreased volume of the journal bearing 420 and/or the thrust bearing 422 acts to maintain the stiffness of the journal bearing 420 and/or the thrust bearing 422.

Figure 7B:
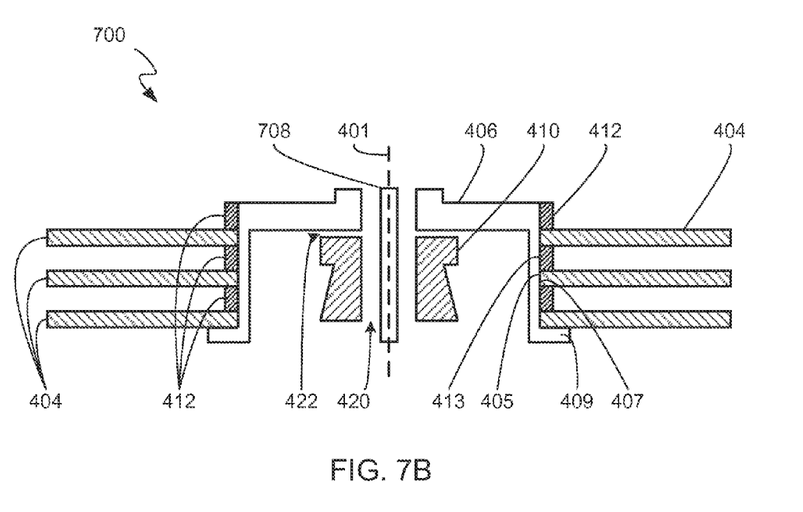
FIG. 7B is a cross-sectional view of a thermally compensated fluid dynamic bearing motor that has been cooled, according to an embodiment of the present invention.

FIG. 7B is a cross-sectional view of the thermally compensated fluid dynamic bearing motor 700 reacting to a decrease in temperature, according to an embodiment of the present invention. As temperature decreases inside the fluid dynamic bearing motor 700, e.g. due to decreased operation or environmental factors, the fluid or oil may increase in viscosity.

As a result, the increase in fluid or oil viscosity may increase the stiffness of the fluid dynamic bearing motor 700.

In response to the temperature decrease, the shaft 708 with the higher CTE than the hub 406 and/or the sleeve 410 may contract at a faster rate than the hub 406 or the sleeve 410. Accordingly, the distance between the shaft 708 and either the hub 406 or sleeve 410, may increase in response to the temperature increase. As a result, even though the fluid or oil may have become more viscous, the increased volume of the journal bearing 420 and/or the thrust bearing 422 acts to maintain the stiffness of the journal bearing 420 and/or the thrust bearing 422.

Figure 8:
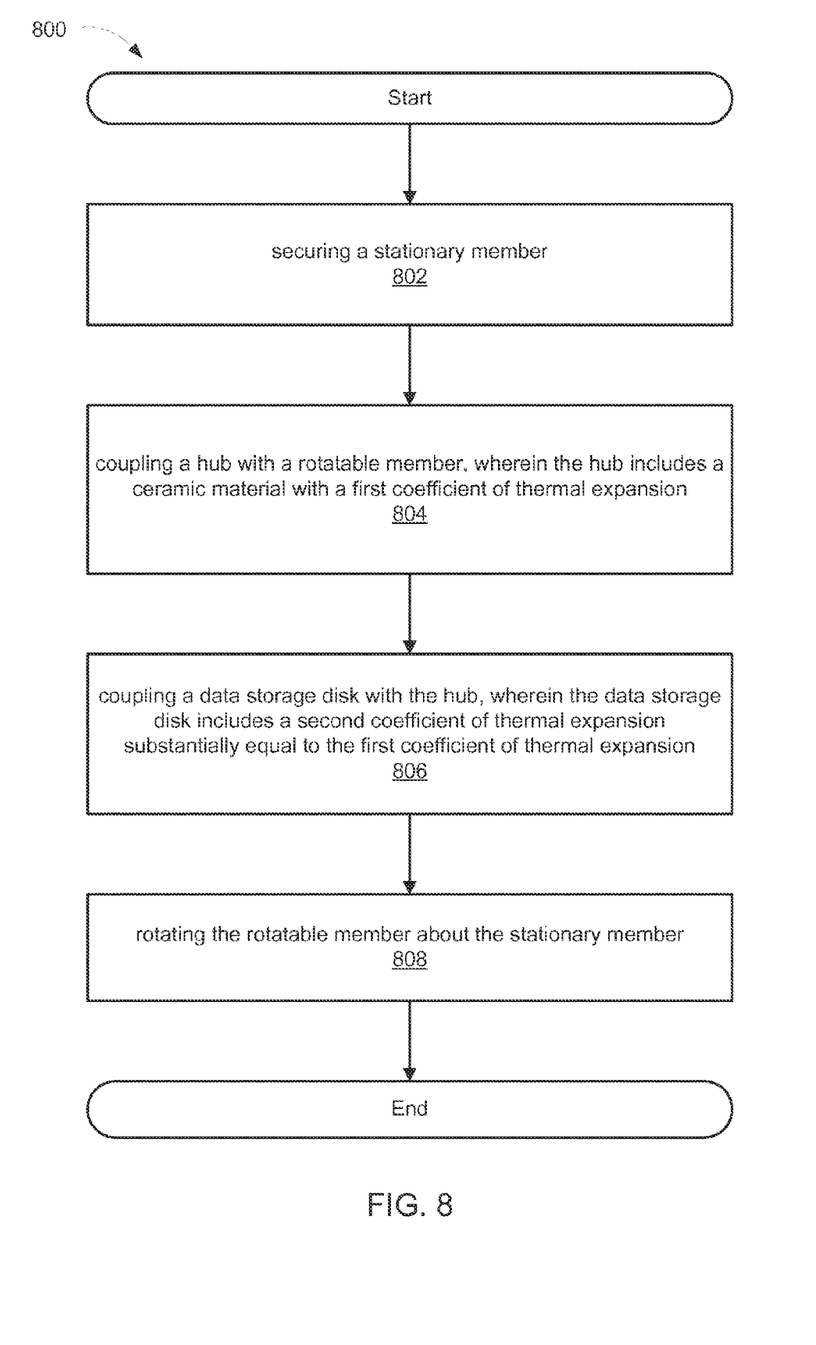
FIG. 8 depicts a flowchart of an exemplary process of operating a thermally compensated fluid dynamic bearing motor, according to an embodiment of the present invention.

FIG. 8 depicts a flowchart 800 of an exemplary process of operating a thermally compensated fluid dynamic bearing motor, according to an embodiment of the present invention. In a block 802, a stationary member is secured. For example, in FIG. 5, a stationary component may include a sleeve with a centerline axis. Alternatively, for example, in FIG. 6, a stationary component may include a shaft with a centerline axis that does not rotate with respect to a housing.

In various embodiments, the rotatable member includes a ceramic material. For example, in FIGS. 5 and 6, the shaft portion or sleeve portion may be formed by a ceramic material, respectively. In some embodiments, the stationary member includes a ceramic material. For example, in FIGS. 5 and 6, the sleeve portion or shaft portion may be formed by a ceramic material, respectively.

Ceramic materials may provide better wear properties than many of the materials currently used in motors. Since embodiments of the present invention allow for the use of ceramic materials for the hub and/or sleeve, the components in fluid dynamic bearings may be worn at a slower rate, thereby increasing the lifetime of such bearings.

In a block 804, a hub is coupled with a rotatable member, wherein the hub includes ceramic material with a first coefficient of thermal expansion. For example, in FIGS. 4-6, a hub or hub portion may be formed from ceramic material. In some embodiments, the hub is supported by a sleeve. For example, in FIGS. 4 and 6, a sleeve or sleeve portion may support a hub or hub portion, respectively.

In various embodiments, an interfacial region located between the shaft and the sleeve defines a fluid dynamic bearing. For example, in FIG. 4, an interfacial region located between the shaft and the sleeve defines a journal and/or thrust bearing. In some embodiments, the sleeve includes ceramic material. For example, in FIGS. 4-6, the sleeve may be formed by ceramic material.

In various embodiments, the hub and the rotatable member are formed by a single or unitary piece of ceramic material. In further embodiments, the hub and the sleeve are formed by a single or unitary piece of ceramic material. For example, in FIG. 4 or 6, the hub or hub section may form a single or unitary piece of material with the sleeve or sleeve portion, respectively. Alternatively, for example, in FIG. 4 or 5, the hub or hub section may form a single or unitary piece of material with the shaft or shaft portion, respectively. Further, the single or unitary piece of material may be ceramic material.

In some embodiments the rotatable member is a sleeve with an axial bore and the stationary member is a shaft disposed within the axial bore of the sleeve. For example, in FIGS. 4 and 6, the rotatable member may be the sleeve with an axial bore and the stationary member may be the shaft disposed within the axial bore of the sleeve. In other embodiments, the stationary member is a sleeve with an axial bore and the rotatable member is a shaft disposed within the axial bore of the sleeve. For example, in FIGS. 4 and 5, the stationary member may be a sleeve with an axial bore and the rotatable member may be a shaft disposed within the axial bore of the sleeve.

In a block 806 of FIG. 8, a data storage disk is coupled with the hub, wherein the data storage disk includes a second coefficient of thermal expansion substantially equal to the first coefficient of thermal expansion. For example, in FIGS. 4-6, a data storage disk may be coupled with the hub, where the data storage disk and hub have substantially the same coefficient of thermal expansion.

In some embodiments, there may be multiple data storage disks and spacers disposed between respective disks of the multiple data storage disks, wherein the spacers include ceramic material. For example, in FIGS. 4-6, there may be multiple data storage disks and spacers between the multiple data storage disks. Further, in FIGS. 4-6, the spacers may be formed by ceramic material.

In one embodiment, the plurality of data storage disks include a material operable to be magnetically written to when locally heated. For example, in FIG. 4, the data storage disks may be formed by materials used in HAMR technology, for example, FePt, CoPt, or other high-coercivity materials.

In various embodiments, the rotatable member includes a material with a third coefficient of thermal expansion substantially equal to the first coefficient of thermal expansion and the stationary member includes a material with a fourth coefficient of thermal expansion greater than the first coefficient of thermal expansion. In one embodiment, the sleeve includes a material with a third coefficient of thermal expansion substantially equal to the first coefficient of thermal expansion and the shaft includes a material with a fourth coefficient of thermal expansion greater than the first coefficient of thermal expansion.

For example, in FIGS. 4 and 6, the sleeve or sleeve portion may include a coefficient of thermal expansion substantially equal to the coefficient of thermal expansion of the hub and/or the data storage disk. Further, the shaft may include a coefficient of thermal expansion greater than the coefficient of thermal expansion of the hub and/or the data storage disk.

Conversely, the shaft or shaft portion may include a coefficient of thermal expansion substantially equal to the coefficient of thermal expansion of the hub and/or the data storage disk. Further, the sleeve may include a coefficient of thermal expansion greater than the coefficient of thermal expansion of the hub and/or the data storage disk.

In some embodiments, the ceramic material is silicon carbide. For example, in FIGS. 4-6, the ceramic material of the hub, hub portion, sleeve, sleeve portion, shaft, and/or shaft portion may be silicon carbide.

In a block 808 of FIG. 8, the rotatable member is rotated about the stationary member. For example, in FIG. 5, the hub portion and shaft portion rotate about the sleeve. Alternatively, in FIG. 6, the hub portion and sleeve portion rotate about the shaft.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. An apparatus comprising:
   a shaft;
   a sleeve rotatable about said shaft; and a hub supported by said sleeve and comprising ceramic material with a first coefficient of thermal expansion, wherein said hub is operable to be coupled with a data storage disk, wherein further said first coefficient of thermal expansion is substantially equal to a second coefficient of thermal expansion of said data storage disk.

2. The apparatus of claim 1, wherein said sleeve comprises ceramic material.

3. The apparatus of claim 1, wherein said hub and said sleeve are formed by a single piece of ceramic material.

4. The apparatus of claim 1, wherein the data storage disk comprises a plurality of data storage disks coupled to said hub and further comprising spacers disposed between respective disks of said plurality of data storage disks, wherein said spacers comprise ceramic material with a third coefficient of thermal expansion substantially equal to said second coefficient of thermal expansion.

5. The apparatus of claim 1, wherein said sleeve has a third coefficient of thermal expansion and said shaft has a fourth coefficient of thermal expansion, wherein said fourth coefficient of thermal expansion is greater than said third coefficient of thermal expansion.

6. The apparatus of claim 1, wherein said sleeve has a third coefficient of thermal expansion substantially equal to said first coefficient of thermal expansion, and wherein said shaft has a fourth coefficient of thermal expansion greater than said first coefficient of thermal expansion.

7. The apparatus of claim 1, wherein said ceramic material is silicon carbide.

8. An apparatus comprising:
a stationary member;
a rotatable member rotatable about said stationary member; and
a hub coupled with said rotatable member and comprising ceramic material with a first coefficient of thermal expansion, wherein said hub is operable to be coupled with a disk substrate, and
wherein further said first coefficient of thermal expansion substantially matches a second coefficient of thermal expansion of said disk substrate.

9. The apparatus of claim 8, wherein:
said rotatable member comprises a sleeve with an axial bore and a third coefficient of thermal expansion;
said stationary member comprises a shaft disposed within said axial bore of said sleeve and a fourth coefficient of thermal expansion, and further comprising an interfacial region located between said rotatable member and said stationary member, wherein said interfacial region defines a fluid dynamic bearing; and
said fourth coefficient of thermal expansion is greater than said third coefficient of thermal expansion.

10. The apparatus of claim 8, wherein:
said stationary member comprises a sleeve with an axial bore and a third coefficient of thermal expansion;
said rotatable member comprises a shaft disposed within said axial bore of said sleeve and a fourth coefficient of thermal expansion, and further comprising an interfacial region located between said rotatable member and said stationary member, wherein said interfacial region defines a fluid dynamic bearing; and
said fourth coefficient of thermal expansion is greater than said third coefficient of thermal expansion.

11. The apparatus of claim 8, wherein said rotatable member comprises ceramic material.

12. The apparatus of claim 8, wherein said hub and said rotatable member are formed by a unitary piece of ceramic material.

13. The apparatus of claim 8, further comprising:
a plurality of said disk substrates coupled to said hub; and
spacers disposed between respective disks of said plurality of disk substrates, wherein said spacers comprise ceramic material with a third coefficient of thermal expansion substantially matching said second coefficient of thermal expansion.

14. The apparatus of claim 8, wherein said rotatable member has a third coefficient of thermal expansion substantially matching said first coefficient of thermal expansion, and said stationary member has a fourth coefficient of thermal expansion greater than said first coefficient of thermal expansion.

15. An apparatus comprising:
a stationary member;
a rotatable member rotatable about said stationary member;
a hub coupled with said rotatable member, wherein said hub comprises a first coefficient of thermal expansion; and
a plurality of disk substrates coupled with said hub, wherein:
said plurality of disk substrates comprises a material operable to be magnetically written to when locally heated; and
said material comprises a second coefficient of thermal expansion substantially equal to said first coefficient of thermal expansion.

16. The apparatus of claim 15, wherein said rotatable member comprises ceramic material with a third coefficient of thermal expansion substantially equal to said first coefficient of thermal expansion.

17. The apparatus of claim 15, wherein said stationary member comprises ceramic material with a third coefficient of thermal expansion substantially equal to said first coefficient of thermal expansion.

* * * * *

UNITED STATES PATENT AND TRADEMARK OFFICE
CERTIFICATE OF CORRECTION

PATENT NO. : 8,493,820 B1
APPLICATION NO. : 13/481731
DATED : July 23, 2013
INVENTOR(S) : Timothy Edward Langlais et al.

Page 1 of 1

It is certified that error appears in the above-identified patent and that said Letters Patent is hereby corrected as shown below:

In the claims, in column 12, after claim 17 add:

18. The apparatus of Claim 15, wherein said hub and said rotatable member are formed by a single piece of ceramic material with said first coefficient of thermal expansion.

19. The apparatus of Claim 15, further comprising spacers disposed between respective disks of said plurality of disk substrates, wherein said spacers comprise ceramic material with a third coefficient of thermal expansion substantially equal to said first coefficient of thermal expansion.

20. The apparatus of Claim 15, wherein said stationary member comprises material with a third coefficient of thermal expansion greater than said first coefficient of thermal expansion.

Signed and Sealed this
Seventeenth Day of December, 2013

Margaret A. Focarino
*Commissioner for Patents of the United States Patent and Trademark Office*

UNITED STATES PATENT AND TRADEMARK OFFICE
CERTIFICATE OF CORRECTION

Page 1 of 2

PATENT NO. : 8,493,820 B1
APPLICATION NO. : 13/481731
DATED : July 23, 2013
INVENTOR(S) : Timothy Edward Langlais et al.

It is certified that error appears in the above-identified patent and that said Letters Patent is hereby corrected as shown below:

Delete the title page and substitute therefore the attached title page showing the corrected number of claims in patent.

In the claims, in column 12, after claim 17 add:

18. The apparatus of Claim 15, wherein said hub and said rotatable member are formed by a single piece of ceramic material with said first coefficient of thermal expansion.

19. The apparatus of Claim 15, further comprising spacers disposed between respective disks of said plurality of disk substrates, wherein said spacers comprise ceramic material with a third coefficient of thermal expansion substantially equal to said first coefficient of thermal expansion.

20. The apparatus of Claim 15, wherein said stationary member comprises material with a third coefficient of thermal expansion greater than said first coefficient of thermal expansion.

This certificate supersedes the Certificate of Correction issued December 17, 2013.

Signed and Sealed this
Fourth Day of February, 2014

Michelle K. Lee
*Deputy Director of the United States Patent and Trademark Office*

(12) United States Patent
Langlais et al.

(10) Patent No.: US 8,493,820 B1
(45) Date of Patent: Jul. 23, 2013

(54) MATCHED CTE DRIVE

(76) Inventors: Timothy Edward Langlais, Minneapolis, MN (US); Troy Michael Herndon, San Jose, AZ (US)

(*) Notice: Subject to any disclaimer, the term of this patent is extended or adjusted under 35 U.S.C. 154(b) by 0 days.

(21) Appl. No.: 13/481,731

(22) Filed: May 25, 2012

(51) Int. Cl.
*G11B 11/00* (2006.01)
(52) U.S. Cl.
USPC .................. 369/13.33; 369/13.24; 360/69
(58) Field of Classification Search
None
See application file for complete search history.

(56) References Cited

U.S. PATENT DOCUMENTS

| | | | |
|---|---|---|---|
| 6,619,847 B1 | 9/2003 | Ishikawa et al. | |
| 6,619,848 B2 | 9/2003 | Ishikawa et al. | |
| 6,712,517 B2 | 3/2004 | Hokkirigawa et al. | |
| 6,731,456 B2 | 5/2004 | Parsoneault et al. | |
| 6,799,893 B2 | 10/2004 | Hokkirigawa et al. | |
| 7,168,857 B2 | 1/2007 | Hokkirigawa et al. | |
| 7,196,028 B2 | 3/2007 | Ujita et al. | |
| 7,465,097 B2 | 12/2008 | Kull | |
| 7,625,125 B2 | 12/2009 | Kull et al. | |
| 8,002,471 B2 | 8/2011 | Satoji et al. | |
| 8,374,063 B2 * | 2/2013 | Tanaka et al. | 369/13.33 |
| 2003/0107281 A1 | 6/2003 | Obara | |

FOREIGN PATENT DOCUMENTS

| | | |
|---|---|---|
| DE | 102007046248 | 4/2009 |
| EP | 515687 A1 | 5/1992 |
| EP | 488402 | 6/1992 |
| EP | 825159 | 2/1998 |

* cited by examiner

*Primary Examiner* — Muhammad N Edun (57) ABSTRACT

A thermally compensated fluid dynamic bearing motor includes a stationary member and a rotatable member rotatable about the stationary member. A hub is coupled with the rotatable member and includes ceramic material with a first coefficient of thermal expansion, wherein the hub is operable to be coupled with a data storage disk. Further the first coefficient of thermal expansion is substantially equal to a second coefficient of thermal expansion of the data storage disk.

20 Claims, 6 Drawing Sheets